Sept 17, 1957 H. BENDER ET AL 2,806,769
GAS REACTOR
Filed June 7, 1955 2 Sheets-Sheet 2
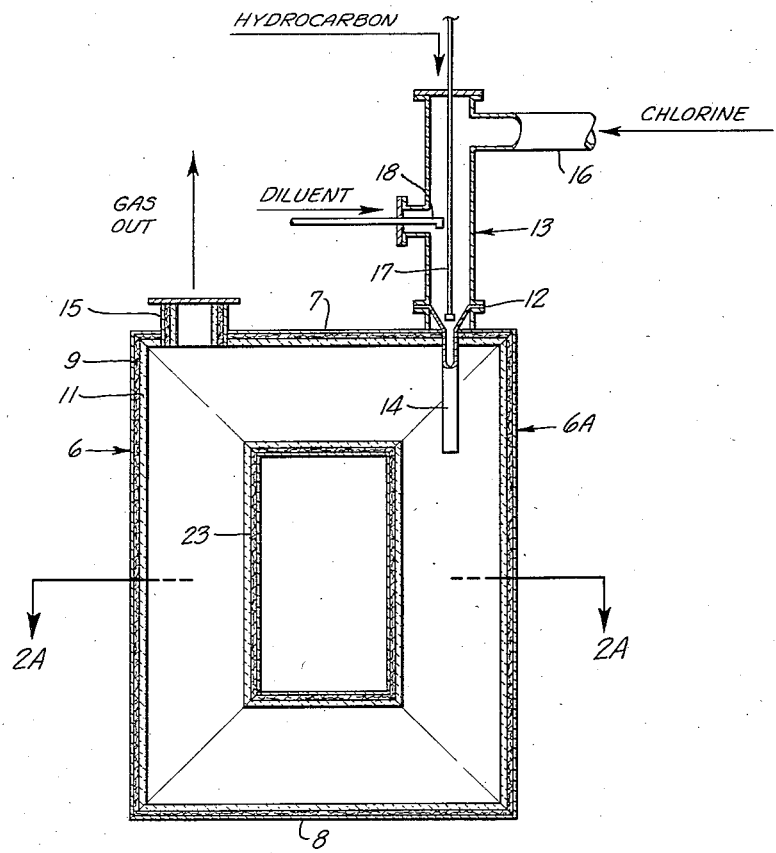
FIG_2_
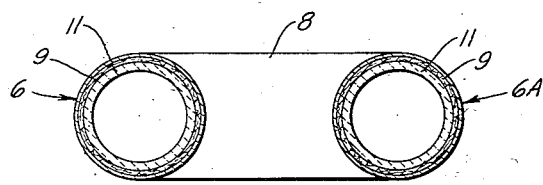
FIG_2A_
INVENTOR.
Harry Bender
Robert P. Obrecht
ECKHOFF & SLICK, Attys.
BY *[signature]*
A member of the firm.

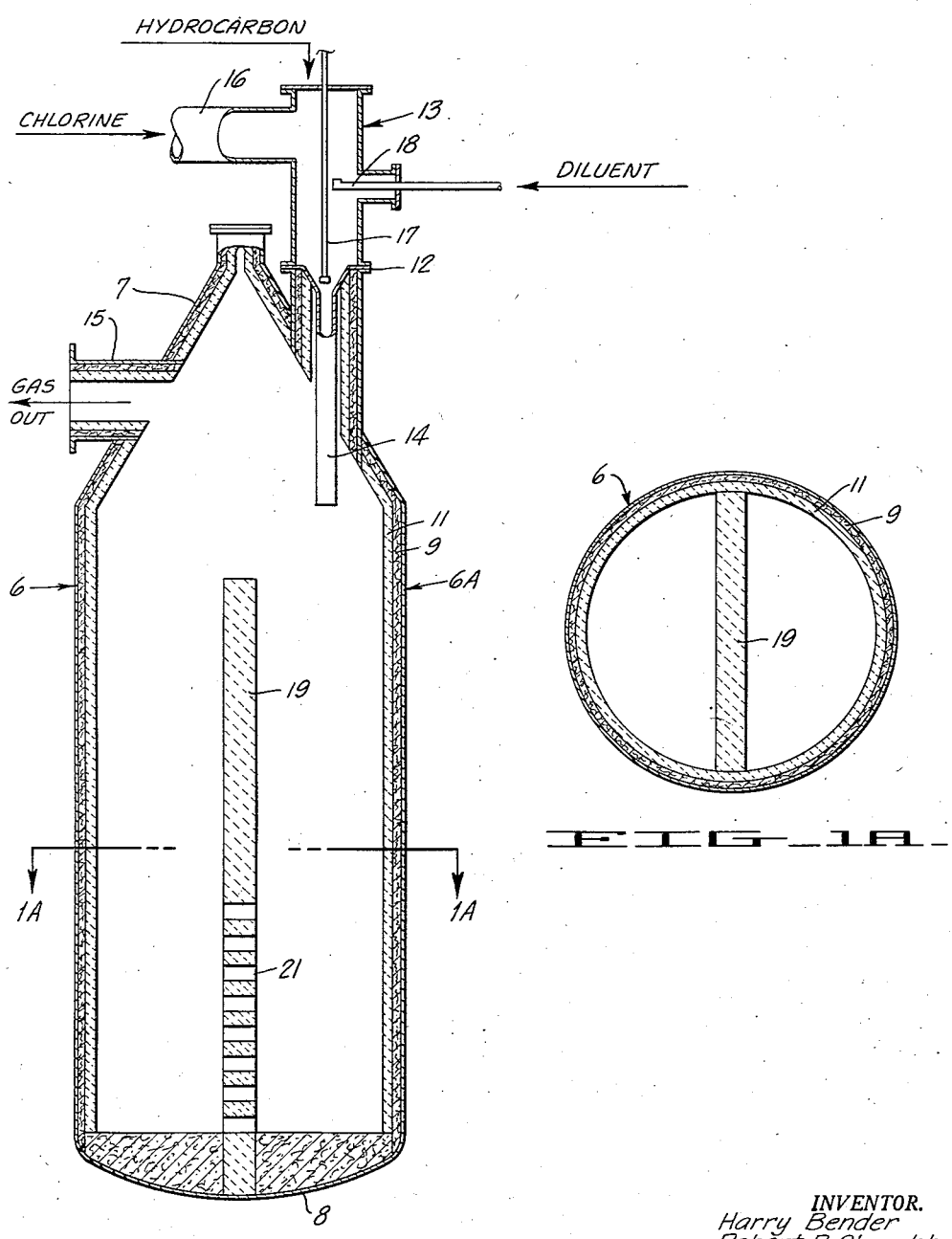

UnitedStatesPatentOffice 2,806,769
Patented Sept. 17, 1957

2,806,769

GAS REACTOR

Harry Bender, Torrance, and Robert P. Obrecht, Concord, Calif., assignors to Stauffer Chemical Company, a corporation of Delaware Application June 7, 1955, Serial No. 513,768

2 Claims. (Cl. 23—284)

This invention relates to apparatus suitable for exothermic gas phase chlorination reactions.

Various hydrocarbons and hydrocarbon mixtures are chlorinated to provide useful products. For example, propane is perchlorinated or fully chlorinated by substitution to provide carbon tetrachloride and perchlorethylene, the reaction being exothermic. It is desirable to have the carbon tetrachloride and perchlorethylene products substantially free of even minor amounts of partially chlorinated compounds. To secure optimum reaction conditions, thorough mixing of the reactants must be achieved and maintained and "pockets" in the reactor must be avoided. To attain satisfactory results, the temperature of reaction must be maintained within relatively close limits and in the case of propane, between 535° and 540° C. or as high as 625° C., and there must be adequate retention time and a high degree of mixing; in accordance with the present invention, thorough mixing is achieved by utilizing the kinetic energy of the incoming gas in a reactor of novel design.

Because of the highly exothermic nature of these reactions, it is usual to employ a diluent to absorb sufficient heat of reaction to prevent an excessive temperature rise, the diluent being applied only in such quantity that the reaction is thermally self-sustaining and is maintained within the desired temperature range. The gases to be reacted are usually admitted to the reactor at a relatively low temperature and in such manner as to minimize reaction prior to admittance to the reaction zone. It is therefore necessary that the reactants and diluent be immediately and thoroughly mixed prior to entrance; that mixing continue within the reactor and that any irregularities in the flow of the materials into or within the reactor be absent to the end that smooth and uniform operation may be attained. The reactor of the present invention is particularly characterized in that it enables uniform and smooth operation to be attained along with excellent and precise control of the reaction temperature.

It is in general the broad object of the present invention to provide a novel form of gas phase reactor for perchlorination reactions, particularly one which enables an exothermic gas reaction to be carried on smoothly and with excellent control over the temperature of reaction.

Another object of the present invention is to provide a gas phase reactor which can be used with either a gas, vapor or liquid diluent or a mixture of these.

The invention includes other objects and features of advantage, some of which, together with the foregoing, will appear hereinafter wherein the present preferred form of gas phase reactor is disclosed.

In general, the objects of the invention are accomplished by employing a reactor having parallel side walls and a central baffle and wherein the reactants are introduced at one end parallel to and adjacent one sidewall, and the products of the reaction are taken off adjacent the opposite sidewall at the same end from which the reactants are introduced.

In the drawings:

Figure 1 is a cross-section of a reactor embodying our invention.

Figure 1A is a section on the lines 1A—1A of Figure 1.

Figure 2 is a cross-section of another embodiment of our reactor.

Figure 2A is a section on the lines 2A—2A of Figure 2.

Referring to the drawings, the reactor includes an elongated shell, generally indicated at 6, and having a sidewall 6A, a first end 7 and a second end 8. The shell and the first and second ends are generally made of steel and are provided with suitable heat insulating linings such as highly calcined alumina or Foamglas (a Pyrex glass containing many small bubbles), these being shown as layers 9 and 11. Although two layers 9 and 11 have been shown, a single layer of Foamglas, of from 3" to 6" may be used. The interior surface of the Foamglas may be protected further by installing a carbon or graphite liner of from 1" to 4" thickness, which is then properly keyed and cemented or pinched to the Foamglas.

The first end 7 may be provided in the form of a cone, as in Figure 1, or may be flat, as in Figure 2; the first end includes a flange 12 on which is mounted an inlet housing, generally indicated at 13. Preferably, that portion of the flange which extends within the shell to the inside edge of the insulation is made of nickel. The inlet housing includes an inlet pipe 14 extending into the reactor from end 7 and parallel to sidewall 6A. The inlet housing 13 also includes a side arm 16, through which one of the gases is admitted. An inlet pipe 17 extends axially of the housing 13 and projects downwardly into the pipe 14, while another inlet pipe 18 extends into the inlet housing 13. An outlet 15 is provided at the opposite side of the reactor from the inlet.

The description thus far has related to both figures. Although the mechanical details of the structures differ somewhat, it is apparent that the principle of operation is exactly the same in both.

In Figures 1 and 1A, the baffle 19 comprises a relatively thin central member which is made of refractory brick or the like and which may have a perforated support section 21. Preferably, the section 21 provides about the same area for the passage of reactants as the space between the baffle and one of the sidewalls. It is obvious that the only function of the perforated section 21 is to provide a support for the section 19, and that section 21 can be eliminated if other support means are provided for the section 19.

In Figure 2, the baffle action is provided by the inner walls 23 of the reaction chamber itself.

In both embodiments, the cross-section is shown to be circular and this configuration is preferred because of the ease of construction; other shapes such as square, octagonal, triangular and the like will serve equally well. Further, the outlet has been shown to be at right angles to the inlet in Figure 1 and parallel to the inlet in Figure 2. It is only important that the outlet be at the same end of the reactor and at opposite sides and either a parallel or right angle outlet may be used with either embodiment.

Similarly, in Figure 2 the reactor is shown to be substantially rectangular in elevation, but it is obvious that other configurations can be utilized.

In operation, for example, chlorine, a hydrocarbon to be chlorinated and a suitable diluent are supplied respectively through the pipes 16, 17 and 18, being thoroughly mixed in the inlet housing and in the pipe 14. The gases flow around the baffle 21 and pass upwardly between the baffle and the inside wall of the chamber.

The apparatus can be operated in any position if the materials fed are in gaseous form. Obviously, it is preferably operated with the first end 7 uppermost and the longitudinal axis of the chamber extending vertically if one or more of the materials fed is in liquid form.

We claim:

1. A reactor comprising an elongated vessel having a first end and a second end; the second end being closed; a baffle provided substantially centrally of the vessel between the ends to provide a first and a second free gas space respectively between each end of the baffle and the first and second ends; the baffle extending from one side of the vessel to the opposite side from adjacent the first end to the second end with a gas passage through the baffle adjacent the second end; said baffle defining with the closed second end a U-shaped gas passage having one leg extending down one wall and one side of the baffle and the other leg extending up the other wall and other side of the baffle; an inlet pipe extending into the free gas space from the first end with its terminal end adjacent to and spaced from that end of the baffle which is adjacent to the first end to eject gas into the first free gas space, down said one leg of said gas passage, around said baffle and thence up along the other leg of the gas passage; and an outlet spaced substantially 180° from the inlet pipe and between the terminal end of said pipe and said first end to remove gases released into said first free gas space from said second leg.

2. A reactor as in claim 1 wherein the free cross-sectional area at each end of the baffle is approximately the same as the free cross-sectional area of each leg of the U-shaped gas passage.

References Cited in the file of this patent

UNITED STATES PATENTS

| | | |
|---|---|---|
| 389,105 | Rew | Sept. 4, 1888 |
| 1,949,563 | Duke | Mar. 6, 1934 |
| 2,330,118 | Frey | Sept. 21, 1943 |
| 2,351,091 | Bar | June 13, 1944 |
| 2,549,565 | Benner | Apr. 17, 1951 |
| 2,590,219 | Stephanoff | Mar. 25, 1952 |